US009883220B1

(12) United States Patent
Hundemer (10) Patent No.: US 9,883,220 B1
(45) Date of Patent: *Jan. 30, 2018

(54) SYSTEMS AND METHODS FOR CAUSING A STUNT SWITCHER TO RUN A MULTI-VIDEO-SOURCE DVE (71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/370,177

(22) Filed: Dec. 6, 2016

Related U.S. Application Data

(63) Continuation of application No. 13/829,017, filed on Mar. 14, 2013, now Pat. No. 9,549,208.

(51) Int. Cl.
*H04N 7/173* (2011.01)
*H04N 21/262* (2011.01)
(Continued)

(52) U.S. Cl.
CPC ..... *H04N 21/26216* (2013.01); *H04N 21/233* (2013.01); *H04N 21/234* (2013.01);
(Continued)

(58) Field of Classification Search
None
See application file for complete search history.

(56) References Cited

U.S. PATENT DOCUMENTS 5,485,611 A * 1/1996 Astle ................. G06F 17/30811
5,682,195 A * 10/1997 Hendricks ............. H04H 20/06
348/E5.002

(Continued)

OTHER PUBLICATIONS

Hundemer, Hank J., U.S. Appl. No. 13/828,632, filed Mar. 14, 2013, 41 pages.

(Continued)

*Primary Examiner* — Jonathan V Lewis
(74) *Attorney, Agent, or Firm* — McDonnell Boehnen Hulbert & Berghoff LLP (57) ABSTRACT

Disclosed herein are systems and methods for causing a stunt switcher to run a multi-video-source digital-video effect (DVE). An example method involves (i) selecting a first log-entry from a traffic log, wherein the first log-entry corresponds to a first video-component (VC) and a first start-time; (ii) selecting a second log-entry from the traffic log, wherein the second log-entry corresponds to a multi-video-source DVE, and a second start-time; (iii) causing the first VC to start being channeled through the stunt switcher proximate the first start-time; (iv) making a determination that a threshold time-period remains before the second start-time; and (v) responsive to making the determination, (a) causing a second VC to start being sent to the stunt switcher, and (b) causing the stunt switcher to run the multi-video-source DVE, thereby causing the stunt switcher to output a combined video, wherein the combined video includes the first VC and the second VC.

20 Claims, 7 Drawing Sheets

(51) Int. Cl.
  *H04N 21/24* (2011.01)
  *H04N 21/234* (2011.01)
  *H04N 21/233* (2011.01)
  *H04N 21/438* (2011.01)
  *H04N 21/83* (2011.01)
  *H04N 21/81* (2011.01)

(52) U.S. Cl.
  CPC ..... *H04N 21/2402* (2013.01); *H04N 21/4383* (2013.01); *H04N 21/812* (2013.01); *H04N 21/83* (2013.01)

(56) References Cited

U.S. PATENT DOCUMENTS

| | | |
|---|---|---|
| 5,852,656 A | 12/1998 | Demos |
| 5,892,535 A | 4/1999 | Allen et al. |
| 6,020,931 A | 2/2000 | Bilbrey et al. |
| 6,069,668 A | 5/2000 | Woodham, Jr. et al. |
| 6,169,542 B1 | 1/2001 | Hooks et al. |
| 6,198,906 B1 | 3/2001 | Boetje et al. |
| 6,374,336 B1 | 4/2002 | Peters et al. |
| 7,010,530 B2 | 3/2006 | Bartkowiak et al. |
| 7,051,354 B2 | 5/2006 | Mears |
| 7,337,231 B1* | 2/2008 | Li .......... H04L 1/0006 709/231 |
| 7,881,191 B2* | 2/2011 | Liu .......... H04W 72/1273 370/230 |
| 7,903,903 B1 | 3/2011 | Acker et al. |
| 8,089,959 B2* | 1/2012 | Szymanski ......... H04L 12/5601 370/359 |
| 8,201,201 B2 | 6/2012 | Des Jardins |
| 8,259,232 B2 | 9/2012 | Lino |
| 8,752,087 B2 | 6/2014 | Begeja et al. |
| 8,789,124 B1 | 7/2014 | Malaby et al. |
| 9,002,991 B2 | 4/2015 | Fletcher |
| 9,396,475 B2 | 7/2016 | Cristofalo et al. |
| 9,549,208 B1* | 1/2017 | Hundemer ....... H04N 21/23424 |
| 2001/0003846 A1 | 6/2001 | Rowe et al. |
| 2002/0107940 A1 | 8/2002 | Brassil |
| 2002/0184047 A1 | 12/2002 | Plotnick et al. |
| 2003/0001880 A1 | 1/2003 | Holtz et al. |
| 2003/0005437 A1 | 1/2003 | Feuer et al. |
| 2003/0097664 A1 | 5/2003 | Meyers et al. |
| 2003/0126597 A1 | 7/2003 | Darby et al. |
| 2003/0146915 A1 | 8/2003 | Brook et al. |
| 2003/0184679 A1 | 10/2003 | Meehan |
| 2003/0188321 A1* | 10/2003 | Shoff .......... G06T 7/00 725/135 |
| 2004/0038691 A1 | 2/2004 | Shin |
| 2004/0107136 A1 | 6/2004 | Nemirofsky et al. |
| 2004/0210945 A1 | 10/2004 | Snyder et al. |
| 2005/0062888 A1 | 3/2005 | Wood et al. |
| 2005/0120279 A1 | 6/2005 | Furukawa et al. |
| 2005/0229227 A1 | 10/2005 | Rogers |
| 2005/0273835 A1 | 12/2005 | Steelberg et al. |
| 2006/0143650 A1 | 6/2006 | Tanikawa et al. |
| 2006/0174281 A1 | 8/2006 | Park |
| 2007/0022437 A1 | 1/2007 | Gerken |
| 2007/0067800 A1 | 3/2007 | Wachtfogel et al. |
| 2007/0113264 A1 | 5/2007 | Rothschild |
| 2007/0143786 A1 | 6/2007 | Deitsch et al. |
| 2007/0162951 A1 | 7/2007 | Rashkovskiy et al. |
| 2007/0192788 A1 | 8/2007 | Danzl et al. |
| 2007/0220544 A1 | 9/2007 | Nash-Puntnam |
| 2007/0261090 A1* | 11/2007 | Miller ............... H04N 7/17318 725/100 |
| 2008/0010342 A1 | 1/2008 | Gebhardt et al. |
| 2008/0239162 A1 | 10/2008 | Munsell et al. |
| 2008/0244663 A1 | 10/2008 | Munsell et al. |
| 2008/0250447 A1 | 10/2008 | Rowe et al. |
| 2008/0250448 A1 | 10/2008 | Rowe et al. |
| 2008/0276269 A1 | 11/2008 | Miller et al. |
| 2009/0070807 A1 | 3/2009 | Jacobs |
| 2009/0070808 A1 | 3/2009 | Jacobs |
| 2009/0070837 A1 | 3/2009 | Jacobs |
| 2009/0164904 A1* | 6/2009 | Horowitz .......... G06F 17/30817 715/723 |
| 2009/0268806 A1 | 10/2009 | Kim et al. |
| 2009/0276805 A1* | 11/2009 | Andrews, II ........... G06Q 30/02 725/35 |
| 2010/0050083 A1 | 2/2010 | Axen et al. |
| 2010/0166257 A1 | 7/2010 | Wredenhagen |
| 2010/0199299 A1* | 8/2010 | Chang ................ H04N 7/17318 725/32 |
| 2011/0283311 A1 | 11/2011 | Luong |
| 2011/0293244 A1 | 12/2011 | Kuriyama |
| 2011/0321084 A1 | 12/2011 | Takahashi et al. |
| 2012/0084811 A1 | 4/2012 | Thompson et al. |
| 2012/0185905 A1 | 7/2012 | Kelley |
| 2012/0291067 A1 | 11/2012 | Wiles |
| 2013/0055306 A1 | 2/2013 | Macrae et al. |
| 2013/0272678 A1 | 10/2013 | Bryan et al. |
| 2014/0089966 A1 | 3/2014 | Briggs et al. |
| 2014/0165097 A1 | 6/2014 | Chase |
| 2014/0195675 A1 | 7/2014 | Silver |
| 2014/0259051 A1 | 9/2014 | Strein et al. |
| 2014/0259074 A1 | 9/2014 | Ansari et al. |
| 2014/0304366 A1 | 10/2014 | Fletcher |
| 2014/0304367 A1 | 10/2014 | Fletcher |
| 2014/0317666 A1 | 10/2014 | Chiarulli et al. |
| 2014/0358267 A1 | 12/2014 | Littlejohn et al. |
| 2014/0373044 A1 | 12/2014 | Carrol et al. |
| 2014/0380394 A1 | 12/2014 | Perron et al. |

OTHER PUBLICATIONS

Hundemer, Hank J., U.S. Appl. No. 13/828,682, filed Mar. 14, 2013, 40 pages.
Hundemer, Hank J., U.S. Appl. No. 13/828,939, filed Mar. 14, 2013, 47 pages.
Hundemer, Hank J., U.S. Appl. No. 13/829,017, filed Mar. 14, 2013, 45 pages.
Hundemer, Hank J., U.S. Appl. No. 13/829,150, filed Mar. 14, 2013, 41 pages.
Hundemer, Hank J., U.S. Appl. No. 13/829,368, filed Mar. 14, 2013, 52 pages.
Hundemer, Hank J., U.S. Appl. No. 14/458,789, filed Aug. 13, 2014, 39 pages.
Non-final office action dated May 14, 2014 of U.S. Appl. No. 13/828,632, filed Mar. 14, 2013.
SMPTE Recommended Practice, "Implementing Broadcast Exchange Format (BXF)" RP 2021-9-2009, published Aug. 19, 2009, pp. 1-90.
Non-final office action dated Mar. 7, 2014 of U.S. Appl. No. 13/828,682, filed Mar. 14, 2013.
Final office action dated Jun. 24, 2014 of U.S. Appl. No. 13/828,682, filed Mar. 14, 2013.
Notice of Allowance dated May 21, 2014 of U.S. Appl. No. 13/828,939, filed Mar. 14, 2013.
Non-final office action dated Jun. 26, 2014 of U.S. Appl. No. 13/829,150, filed Mar. 14, 2013.
Non-final office action dated Jul. 3, 2014 of U.S. Appl. No. 13/829,368, filed Mar. 14, 2013.
Advisory Action dated Sep. 24, 2014 of U.S. Appl. No. 13/828,682, filed Mar. 14, 2013.
Office Action dated Oct. 6, 2014 of U.S. Appl. No. 13/829,150, filed on Mar. 14, 2013.
Non-Final Office Action dated Jan. 5, 2015 of U.S. Appl. No. 13/828,632 filed Mar. 14, 2013.
SMTPE ST 2021-4:2012, "Broadcast Exchange Format (BFX)—Schema Documentation".
SMTPE ST 2021-3:2012, "Broadcast Exchange Format (BFX)—Use Cases", Mar. 14, 2012.
NMTPE ST 2021-1:2012, "Broadcast Exchange Format (BFX)—Requirements and Informative Notes", Mar. 14, 2012.
Non-Final Office Action dated Jan. 12, 2015 of U.S. Appl. No. 13/829,368, filed Mar. 14, 2013.

(56) References Cited

OTHER PUBLICATIONS

Hundemer, Hank J., U.S. Appl. No. 14/724,469, filed May 28, 2015, 41 pages.
Notice of Allowance dated May 8, 2015 of U.S. Appl. No. 13/828,939, filed Mar. 14, 2013.
Notice of Allowance dated Jul. 2, 2015 of U.S. Appl. No. 13/828,368, filed Mar. 14, 2013.
Office Action dated Jul. 31, 2015 of U.S. Appl. No. 13/828,632, filed Mar. 14, 2013.
Office Action dated Aug. 25, 2015 of U.S. Appl. No. 13/829,017, filed Mar. 14, 2013.
Non-Final Office Action dated Jan. 29, 2016 of U.S. Appl. No. 14/458,789, filed Aug. 13, 2014.
Final Office Action dated Mar. 8, 2016 of U.S. Appl. No. 13/829,017, filed Mar. 14, 2013.
Pre-Interview First Office Action dated Jun. 6, 2016 of U.S. Appl. No. 14/724,469, filed May 28, 2015.
Advisory Action dated Jun. 16, 2016 of U.S. Appl. No. 13/829,017, filed Mar. 14, 2013.

* cited by examiner

SYSTEMS AND METHODS FOR CAUSING A STUNT SWITCHER TO RUN A MULTI-VIDEO-SOURCE DVE

CROSS REFERENCE TO RELATED APPLICATIONS

This disclosure is a continuation of, and claims priority to, U.S. patent application Ser. No. 14/829,017, filed Mar. 14, 2013, which is hereby incorporated by reference herein in its entirety.

This application also relates to U.S. patent application Ser. No. 13/828,682, entitled "Systems and Methods for Causing a Stunt Switcher to Run a DVE," U.S. patent application Ser. No. 13/829,150, entitled "Systems and Methods for Causing a Stunt Switcher to Run a Bug-Overlay DVE," U.S. patent application Ser. No. 13/828,632, entitled "Systems and Methods for Causing a Stunt Switcher to Run a Bug-Removal DVE," U.S. patent application Ser. No. 13/828,939, entitled "Systems and Methods for Causing a Stunt Switcher to Run a Bug-Overlay DVE with Absolute Timing Restrictions," and U.S. patent application Ser. No. 13/829,368, entitled "Systems and Methods for Causing a Stunt Switcher to Run a Snipe-Overlay DVE," all of which are commonly assigned to the assignee of the present application, and were filed on Mar. 14, 2013, and are hereby incorporated by reference herein in their entirety.

USAGE AND TERMINOLOGY

Throughout this application, with respect to all reasonable derivatives of such terms, and unless otherwise specified (and/or unless the particular context clearly dictates otherwise), each usage of:

"a" or "an" is meant to read as "at least one."

"the" is meant to be read as "the at least one."

the term "video" refers to any material represented in a video format (i.e., having multiple frames). In some instances, video may include multiple sequential frames that are identical or nearly identical, and that may give the impression of a still image. Video may or may not include an audio portion.

the term "video component" (VC) refers to video that one of ordinary skill in the art would typically consider to be self-contained, and that is typically separately scheduled by a traffic system (also referred to as a scheduling-and-sequencing system) of a television-broadcasting system.

TECHNICAL FIELD

The disclosed systems and methods relate generally to television-broadcasting technology.

BACKGROUND

A television-broadcasting system typically includes a traffic system that performs functions related to broadcast scheduling. For example, the traffic system may facilitate the creation of a traffic-log (log), which is a broadcast schedule for a given station during a given time period. The log may include multiple ordered log entries, each of which may correspond to a VC. Each log entry may also include scheduling data for the video, and therefore the log may generally represent the scheduled sequence of VCs intended to be broadcast during the corresponding time period.

There are several types of VCs, non-limiting examples of which include a show-segment VC, a commercial VC, and a promotion VC. A show-segment VC consists of at least a portion of a show, and potentially one or more commercials. A show may be, for example, an episode of a sitcom, a news program, or a movie. A commercial VC consists of a single commercial. Typically, a television-broadcasting company broadcasts a commercial VC in exchange for payment or other compensation from the provider of the commercial VC. A promotion VC consists of video that promotes something such as an event or another VC. Unlike a commercial VC, the television-broadcasting company typically does not receive a payment or other compensation from a third-party for broadcasting the promotion VC.

The traffic system may communicate with a master control system (MCS), which is the technical hub of a television-broadcasting system and is typically the final point before video is sent to an air-chain system for broadcast. More specifically, the traffic system typically communicates with an automation system of the MCS. The automation system is the logic center of the MCS and may cause the MCS and/or another entity to perform various functions.

Through a communication path, the traffic system may provide the log to the automation system, such that the automation system may traverse and select log entries. The automation system may then cause the MCS and/or another entity to perform certain functions for each selected log-entry at an appropriate time (i.e., based on the corresponding scheduling data). For example, the automation system may cause a recording-and-playout device (RAPD) to retrieve and playout a stored VC such that it may be channeled through one or more entities within the MCS (e.g., routers and switchers), and sent to an air-chain system for broadcast. In another example, the automation system may cause a streaming VC received from a streaming-video source (SVS) to be channeled through the MCS and sent to the air-chain system for broadcast.

In some instances, when video is channeled through the MCS, the video may be channeled through a stunt switcher of the MCS. The stunt switcher performs functions related to digital video effects (DVE) (sometimes referred to as "stunt work"). For example, the stunt switcher may run a DVE, which dynamically manipulates video that is being channeled through the stunt switcher.

SUMMARY

In one aspect, a method for use in a television-broadcasting system having a stunt switcher is disclosed. The method involves (i) selecting a first log-entry from a traffic log, wherein the first log-entry corresponds to a first video-component (VC) and to a first start-time; (ii) selecting a second log-entry from the traffic log, wherein the second log-entry corresponds to a multi-video-source digital-video-effect (DVE) stored in the stunt switcher, and to a second start-time, wherein the second start-time is later than the first start-time; (iii) causing the first VC to start being channeled through the stunt switcher proximate the first start-time; (iv) making a determination that a threshold time-period remains before the second start-time; and (v) responsive to making the determination that the threshold time-period remains before the second start-time, (a) causing a second VC to start being sent to the stunt switcher, and (b) causing the stunt switcher to run the stored multi-video-source DVE, thereby causing the stunt switcher to output a combined video, wherein the combined video includes both the first VC and the second VC.

In another aspect, another method for use in a television-broadcasting system having a stunt switcher and an automation system is disclosed. The method involves (i) the automation system selecting a first log-entry from a traffic log, wherein the first log-entry corresponds to a first VC and to a first start-time; (ii) the automation system selecting a second log-entry from the traffic log, wherein the second log-entry corresponds to a multi-video-source DVE stored in the stunt switcher, and to a second start-time, wherein the second start-time is later than the first start-time; (iii) the automation system causing the first VC to start being channeled through the stunt switcher proximate the first start-time; (iv) the automation system making a determination that a threshold time-period remains before the second start-time; and (v) responsive to the automation system making the determination that the threshold time-period remains before the second start-time, the automation system (a) causing a second VC to start being sent to the stunt switcher, and (b) causing the stunt switcher to run the stored multi-video-source DVE, thereby causing the stunt switcher to output a combined video, wherein the combined video includes both the first VC and the second VC.

In another aspect, a television-broadcasting system includes a (i) stunt switcher; and (ii) an automation system having a computer-readable medium including a set of program instructions, that when executed by the automation system, cause the automation system to perform a set of functions. The set of functions includes (i) selecting a first log-entry from a traffic log, wherein the first log-entry corresponds to a first VC and to a first start-time; (ii) selecting a second log-entry from the traffic log, wherein the second log-entry corresponds to a multi-video-source DVE stored in the stunt switcher, and to a second start-time, wherein the second start-time is later than the first start-time; (iii) causing the first VC to start being channeled through the stunt switcher proximate the first start-time; (iv) making a determination that a threshold time-period remains before the second start-time; and (v) responsive to making the determination that the threshold time-period remains before the second start-time, (a) causing a second VC to start being sent to the stunt switcher, and (b) causing the stunt switcher to run the stored multi-video-source DVE, thereby causing the stunt switcher to output a combined video, wherein the combined video includes both the first VC and the second VC.

DETAILED DESCRIPTION OF THE DRAWINGS

I. Overview

In the television-broadcasting industry, traffic systems are provided by multiple vendors and often include distinguishing features. However, for a variety of reasons such as to provide compatibility, many traffic systems create logs according to a general industry-wide standard. Likewise, many automation systems are configured to receive and process logs based on this standard. A log entry based on this standard may include certain attributes, including for example a house identifier, a source identifier, a start time, a duration, an episode number, a segment number, and/or an one or more auxiliary notations. These attributes may be generated automatically (e.g., by the traffic system) or may be provided by a user such as a traffic manager.

Typically, a log entry includes one of either a house identifier or a source identifier. If the log entry corresponds to a stored VC, the log entry typically includes a house identifier (sometimes called a "house number"), which identifies the VC. Typically, the house identifier is a unique identifier within a given television-broadcasting system, and maps to a file location in a data storage where the VC is stored. As such, by obtaining the house identifier of a log entry, the automation system may use a mapping table to determine the appropriate file location, and may then retrieve the VC that is stored in that file location. Alternatively, if the log entry corresponds to a streaming VC, the log entry may include a source identifier, which identifies an SVS (e.g., via a mapping table) that provides the streaming VC.

The start time may indicate the intended start time of a corresponding VC. The start time may be represented as an absolute start time or as a calculated start time. A calculated start time indicates that the start time is when the preceding log entry gets "completed" (i.e., when the VC of the previous log entry has played for its corresponding duration). In some instances, the start time may be unknown until it occurs, and therefore the start time may be represented as a manual start time. In such instances, the corresponding VC video is not started until a request is received from a user or a device. The duration indicates the duration of the corresponding VC. In some instances, the duration may be unknown and therefore it may not be included in the log entry. The episode number identifies a particular episode of a show, and the segment number identifies a particular segment number of a show. The episode number and the segment number are included in a log entry that corresponds to a show-segment VC. The one or more auxiliary notations are typically notes that are reviewed by a user (e.g., a traffic manager may provide a note to a master control operator about the corresponding log entry).

The above-described attributes may be stored in corresponding fields in the log entry. For example, the house identifier may be stored in a house-identifier field and the one or more auxiliary notations may be stored in one or more auxiliary-notation fields. Two examples of well-known traffic systems that use the attributes as described above include WO Traffic provided by WideOrbit Inc. of San Francisco, Calif., and OSi-Traffic™ provided by Harris Corporation of Melbourne, Fla.

As discussed above, after an automation system selects a log entry, the automation system may channel the corresponding video VC through a stunt switcher, at which time the stunt switcher may run a DVE to dynamically manipulate the video. In some instances, the stunt switcher dynamically manipulating the video may involve the stunt switcher "pulling back" the video into one of two side-by-side "windows," such that another video may be shown in the other window at the same time. Such a DVE is referred to herein as a multi-video-source DVE. When the stunt switcher runs a multi-video-source DVE, the stunt switcher may therefore output a "combined video," which includes video from two different sources. The combined video may then be sent to an air-chain system for broadcast.

To illustrate an example use-case for a multi-video-source DVE, consider a log having a show-segment VC followed immediately by a promotion VC. For the purposes of the example, assume that the last two minutes of the show-segment VC shows credits (e.g., scrolling movie credits). Without the use of a DVE, the show-segment VC would be broadcast in typical, "full-screen" fashion until the end of its duration, at which time the automation system would cause the promotion VC to be broadcast, again in typical full-screen fashion.

However, by running a multi-video-source DVE, at least a portion of the show-segment VC and the promotion VC may be broadcast simultaneously, such as in two side-by-side windows. For example, if the stunt switcher runs a multi-video-source DVE forty-five seconds before the show-segment VC ends, at that time the stunt switcher may pull back the show-segment VC into a left window, and add the promotion VC (which the stunt switcher may receive from another source) into a right window, resulting in a combined video. The multi-video-source DVE may also cause the promotion VC to be selected as the audio source for the combined video. The stunt switcher may then output this combined video, such that it may be sent to an air-chain system for broadcast.

Continuing with the example illustrated above, after the promotion VC ends (e.g., thirty seconds later assuming that the promotion VC has a duration of thirty seconds), the stunt switcher may then run a restore DVE. A restore DVE may be configured to (when run) effectively terminate the multi-video-source DVE (i.e., by removing the windows and causing only the show-segment VC to be channeled through the stunt switcher). As a result, the last fifteen seconds of credits in the show-segment VC may be broadcast in full-screen fashion (and with the show-segment VC being the selected audio source). Once the show-segment VC ends, the automation system may continue broadcasting video as scheduled in the log.

Running a multi-video-source DVE in this manner allows additional video to be broadcast during a given time period (as compared with using a traditional, linear approach to broadcasting video). This provides a particular advantage in that a broadcasting company may sell additional broadcast time, thereby generating additional revenue.

Since running a multi-video-source DVE may cause some disruption from the perspective of end-viewers, it may be desired to run a multi-video-source DVE only in connection with certain types of VCs and/or only at certain times. For example, as illustrated above, the multi-video-source DVE may be run when a show-segment VC is showing credits, which is often a time when end-viewers are relatively less focused on what is being broadcast. For at least these reasons, running a multi-video-source DVE may be a time-sensitive event.

Running a multi-video-source DVE often occurs in response to a user submitting a request to the stunt switcher via a user interface of the stunt switcher. Among other things, this process is manually intensive and is prone to error as it requires a user to constantly monitor the log and the current time to determine when a multi-video-source DVE should be run before submitting an appropriate request to the stunt switcher and before causing a VC to be sent to the stunt switcher for use with the multi-video-source DVE. The disclosed systems and methods improve upon this process by configuring a log entry such that the log entry may trigger the sending of a VC to a stunt switcher and may further trigger the stunt switcher's running of a multi-video-source DVE that uses the VC (together with another VC). Accordingly, a user such as a traffic manager may use a log as a mechanism for scheduling multi-video-source DVEs.

In one example, a log entry includes an identifier that maps to a set of scripts that, when executed, cause an automation system to perform several functions. For example, the automation system may make a determination that a threshold time-period remains before a start time of the log entry. Further, responsive to making the determination, the automation system may cause a VC to start being sent to the stunt switcher, and may further cause the stunt switcher to run a multi-video-source DVE that uses the VC (together with another VC corresponding to another log entry). In addition, the identifier may be stored in the house-identifier field of the log entry, such that it may be "disguised" as a house identifier as described above. Among other things, this allows the disclosed systems and methods to provide the above-described functionality while adhering to protocols used by many existing traffic systems such as those identified above.

II. Example Television-Broadcasting System

Figure 1:
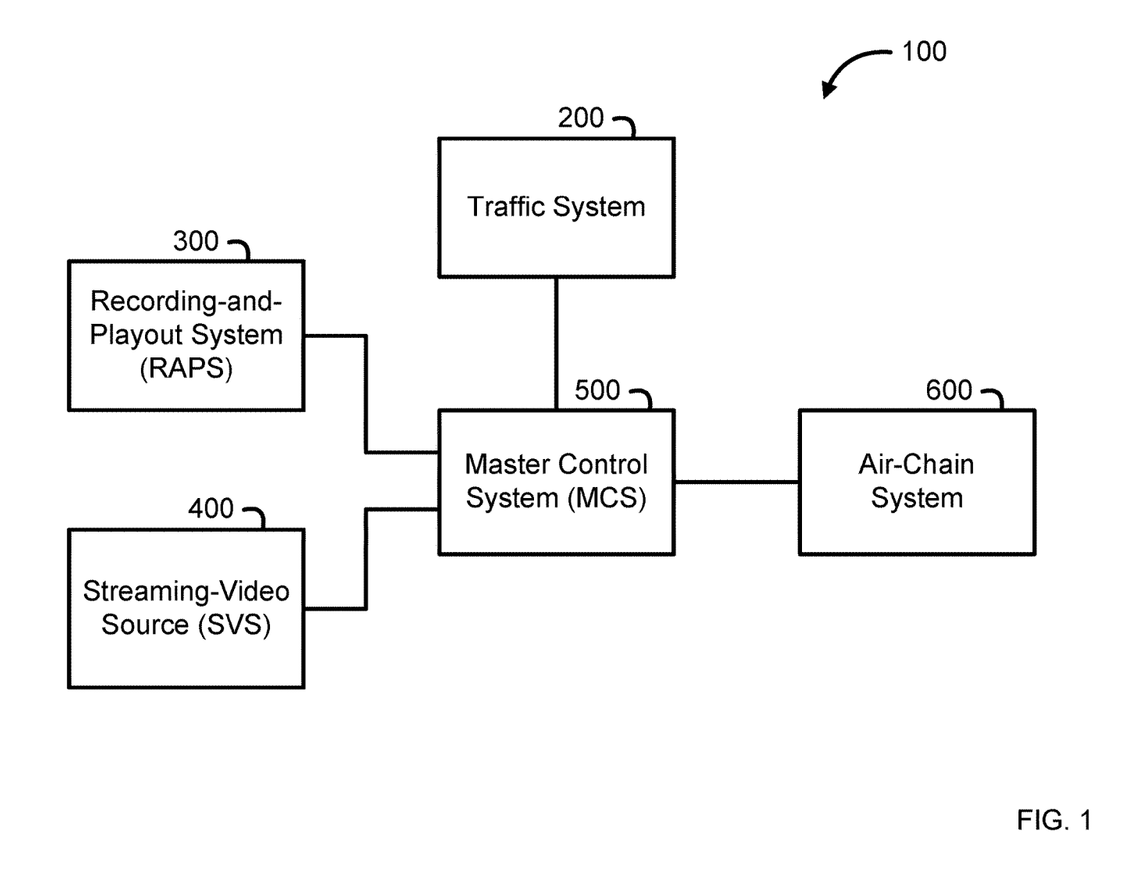
FIG. 1 is a simplified block diagram of an example television-broadcast system.

FIG. 1 shows an example television-broadcasting system, generally designated 100. The television-broadcast system 100 may be configured to perform a variety of functions that relate to television broadcasting. The television-broadcasting system 100 may include a traffic system 200, a recording-and-playout system (RAPS) 300, an SVS 400, a MCS 500, and an air-chain system 600. The MCS 500 may serve as the hub of the television-broadcasting system 100 and may connect to each of the traffic system 200, the RAPS 300, the SVS 400, and the air-chain system 600. Generally, the television-broadcasting system 100 may be configured such that video may be sent from the RAPS 300, the SVS 400, or another source, through the MCS 500, and to the air-chain system 600 for broadcast.

A. Traffic System

Figure 2:
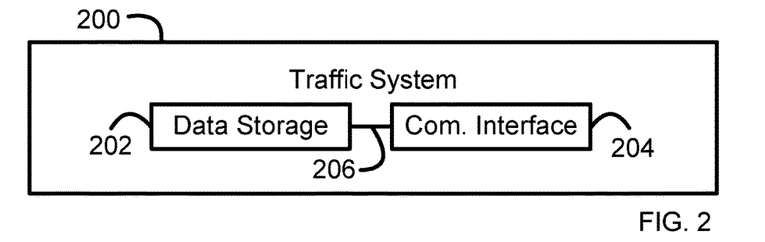
FIG. 2 is a simplified block diagram of an example traffic system.

FIG. 2 shows the traffic system 200 in greater detail. The traffic system 200 may be configured for creating and sending a log to the MCS 500, and may include a data storage 202 and a communication interface 204, both of which may be connected to each other via a connection mechanism (e.g., a bus) 206. The traffic system 200 may be configured to store logs in the data storage 202, and to send the stored logs, via the communication interface 204, to the MCS 500. As discussed above, two example traffic systems are WO Traffic provided by WideOrbit Inc. of San Francisco, Calif., and OSi-Traffic™ provided by Harris Corporation of Melbourne, Fla.

B. RAPS

Figure 3:
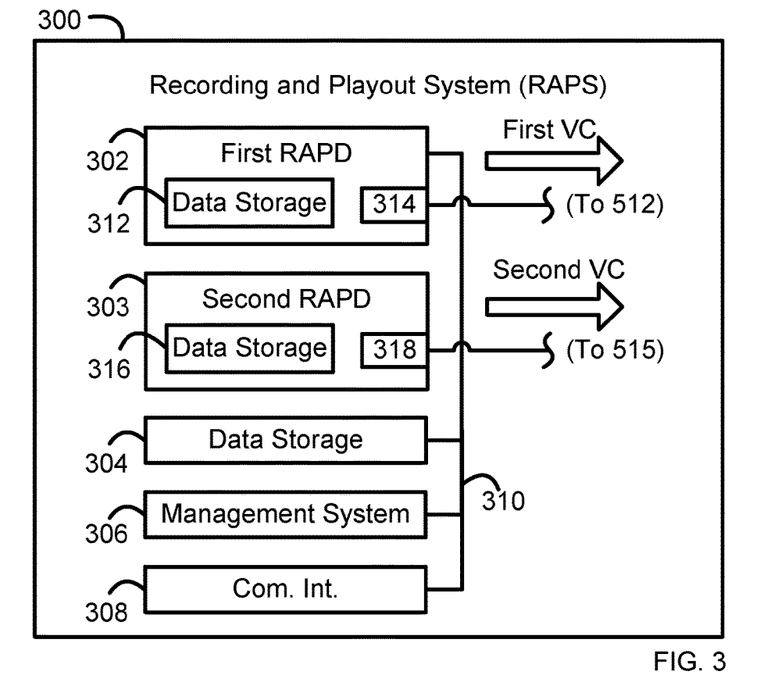
FIG. 3 is a simplified block diagram of an example recording-and-playout system.

FIG. 3 shows the RAPS 300 in greater detail. The RAPS 300 may be configured to record and playout VCs for use by the MCS 500, and may include a first recording-and-playout device (RAPD) 302, a second RAPD 303, a data storage 304, a management system 306, and a communication interface 308, each of which may be connected to each other via a connection mechanism 310.

The RAPDs 302, 303 may be configured to record VCs (e.g., VCs retrieved from the data storage 304) and playout (i.e. send) VCs, via the MCS 500, to the air-chain system 600. The first RAPD 302 may include a data storage 312 and an output 314, both of which may be connected to each other by a connection mechanism (not shown). Likewise, the second RAPD 302 may include a data storage 316 and an output 318, both of which may be connected to each other by a connection mechanism (not shown). The data storages 312, 316 may be used for storing VCs that may be sent via the respective outputs 314, 318.

The management system 306 may be configured to manage the RAPDs 302, 303 by organizing and moving VCs back-and-forth between the RAPDs and the data storage 304. The communication interface 308 may connect the RAPS 300 to the MCS 500 or to another entity. An example of a RAPD is the K2 server provided by Grass Valley™ of San Francisco, Calif.

C. SVS

Figure 4:
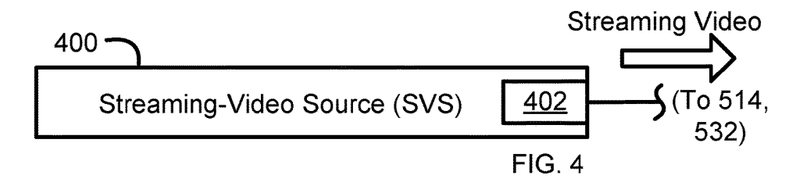
FIG. 4 is a simplified block diagram of an example streaming-video source.

FIG. 4 shows the SVS 400 in greater detail. The SVS 400 is a source configured to send streaming video (e.g., a streaming VC) via an output 402. Streaming video is often received at or shortly before the time when the video is broadcast. In one example, the SVS 400 may send streaming video based on the high-definition serial digital interface (HD-SDI) standard with a data transfer rate of 1.485 Gbps. An example of an SVS is a satellite (e.g., that streams so-called "network television" video) or a newsroom production control system.

D. MCS

Figure 5:
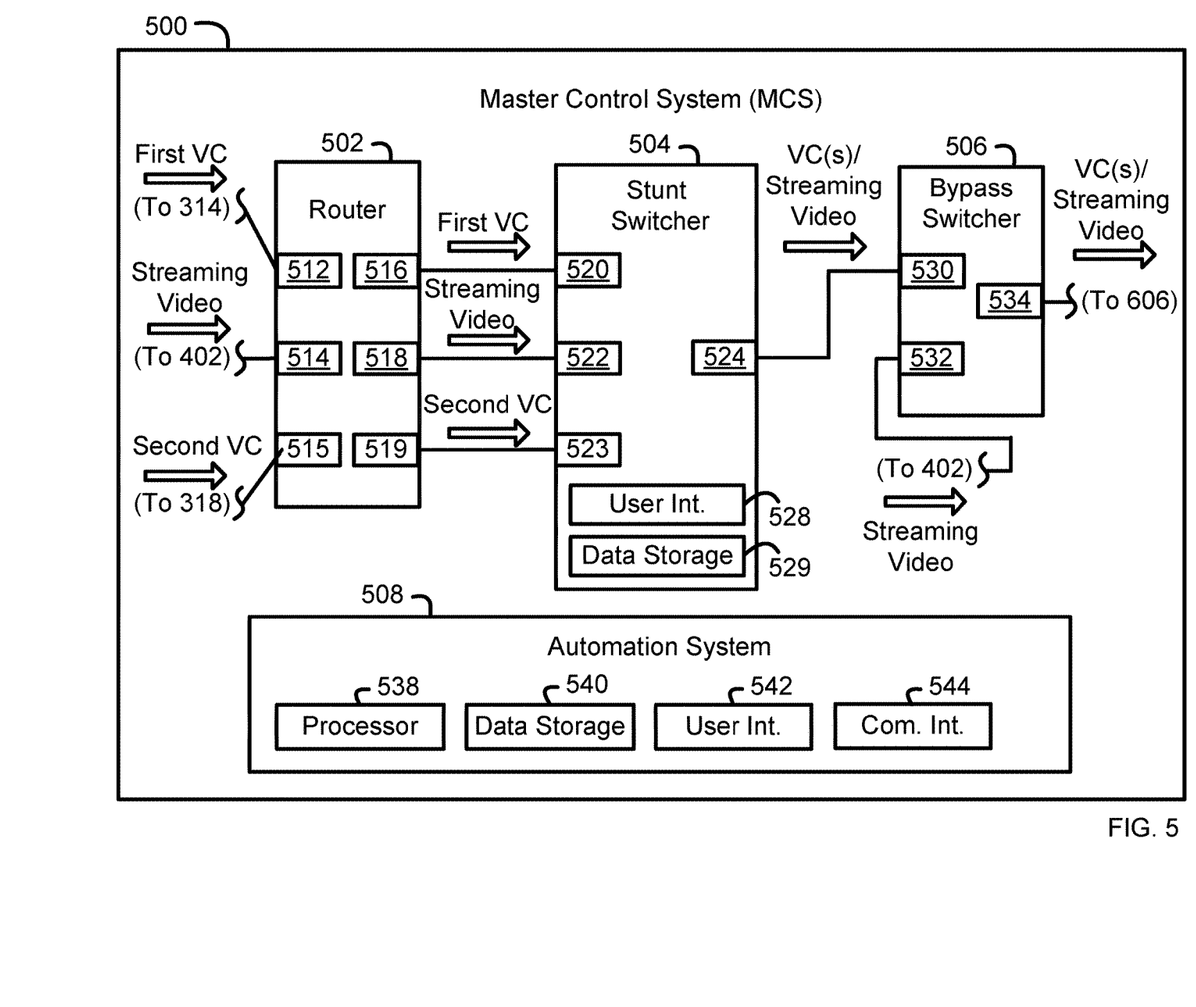
FIG. 5 is a simplified block diagram of an example master control system.

FIG. 5 shows the MCS 500 in greater detail. The MCS 500 may be configured to receive video, channel the video through one or more sources, and send the video to the air-chain system 600 for broadcast. In one example, the MCS 500 includes a router 502, a stunt switcher 504, a bypass switcher 506, and an automation system 508, each of which may be connected to each other by a connection mechanism (not shown).

1. Router

The router 502 may be configured to channel video by mapping inputs to outputs, and may include one or more inputs, including for example, a first input 512, a second input 514, and a third input 515, and one or more outputs, including, for example, a first output 516, a second output 518, and a third output 519. The router 502 may also include a communication interface (not shown). The inputs 512, 514, 515, the outputs 516, 518, 519 and the communication interface may each be connected to each other by a connection mechanism (not shown). Notably, a router may and often does have more inputs than outputs such that it may connect many sources to relatively fewer destinations.

The first RAPD 302 may be connected to the router 502 via the output 314 and the input 512. The SVS 400 may be connected to the router 502 via the output 402 and the input 514. The second RAPD 303 may be connected to the router 502 via the output 318 and the input 515. An example of a router is the Blackmagic Design Videohub provided by Blackmagic Design Pty. Ltd. Of Fremont, Calif.

2. Stunt Switcher

The stunt switcher 504 may be configured to channel video by mapping inputs to outputs, and may include one or more inputs, including, for example, a first input 520, a second input 522, and a third input 523, and one or more outputs, including, for example, an output 524. The stunt switcher 504 may also include a user interface 528, a data storage 529, and a communication interface (not shown).

The inputs 520, 522, 523, the output 524, the user interface 528, the data storage 529, and the communication interface may each be connected to each other by a connection mechanism (not shown). The router 502 may be connected to the stunt switcher 504 via the output 516 and the input 520, via the output 518 and the input 522, and via the output 519 and the input 523. Like a router, a stunt switcher may and often does have more inputs than outputs such that it may connect many sources to relatively fewer destinations. An example of a stunt switcher is the Miranda NVISION NVS5100MC provided by NVision, Inc. of Coppell, Tex.

The stunt switcher 504 may further be configured to perform various functions related to DVEs. A DVE is an effect module (e.g., in the form of a set of program instructions) that is configured to be executed or "run." When run, a DVE dynamically manipulates video being channeled through the stunt switcher. Running a DVE may involve using one or more layers known as "keys" to overlay graphics, video, or other media on video. In some instances, running a DVE may involve simply "resetting" the keys, thereby removing any media being overlayed as a result of another DVE being run.

The stunt switcher 504 may be configured to assist a user in designing a DVE, such as via the user interface 528. Once a DVE is designed, the stunt switcher 504 may store the DVE in the data storage 529. In one example, the stunt switcher may store DVEs in respective DVE registers within the data storage 529. The stunt switcher 504 may also store media used in connection with the DVE in the data storage 529. This allows the stunt switcher 504 to retrieve media as needed. For example, when running a DVE, the stunt switcher 504 may retrieve media from a particular graphic or video register in the data storage 529 as indicated by the DVE. Media may be stored in the data storage 529 in a variety of manners, such as via a file transfer protocol (FTP). As such, by overwriting media stored in the data storage 529, the result of a DVE that is run may be changed.

Once a DVE is designed and stored in the data storage 529, the stunt switcher 504 may then retrieve and run the DVE. In some instances, this may occur in response to a request being received from a user (e.g., via the user interface 528) or from the automation system 508. Accordingly, when a stunt switcher runs a DVE, a VC that is being channeled through the stunt switcher 504 may be dynamically manipulated. This manipulated video may then be sent through the bypass switcher 506 and to the air-chain system 600 for broadcast as described in greater detail below.

In some instances, media used in connection with a DVE may be stored in another location and sent to the stunt switcher 504 as needed. For example, a first and second VC used in connection with a multi-video source DVE may be stored in the data storage 304 of the RAPS 300. Accordingly, the automation system 508 may cause the first RAPD 302 to retrieve the first VC and send it to the stunt switcher 504 via the router 502. Likewise, the automation system 508 may cause the second RAPD 303 to retrieve the second VC and send it to the stunt switcher 504 via the router 502.

As noted above, a multi-video-source DVE is configured to combine multiple videos using respective windows, thereby creating a combined video. A multi-video-source DVE may use a media template (e.g., retrieved from the data storage 529), to define the size, shape, and position of each window. Then, when the multi-video-source DVE is run, the stunt switcher 504 may receive multiple videos via multiple inputs (as indicated by the DVE). Once received, the stunt switcher may channel the VCs to their respective windows, thereby creating the combined video. The stunt switcher 504 may then send the combined video through the bypass switcher 506 to the air-chain system 600 for broadcast.

3. Bypass Switcher

The bypass switcher 506 may be configured to channel video by mapping inputs to outputs. The bypass switcher 506 may include at least one input including, for example, a first input 530 and a second input 532, and at least one output including, for example, an output 534. The bypass switcher 506 may also include a communication interface (not shown). The inputs 530, 532, the output 534, and the communication interface may all be connected to each other by a connection mechanism (not shown). The stunt switcher 504 may be connected to the bypass switcher 506 via the output 524 and the input 530. A bypass switcher may and often does have multiple inputs and a single output such that it may connect many sources to relatively fewer destinations.

Accordingly, provided that the router 502, the stunt switcher 504, and the bypass switcher 506 all have the appropriate input-to-output mappings, a VC sent from the RAPD 302, 303 to the MCS 500 may be channeled through the entities in the MCS and sent out the MCS. Likewise, provided that the router 502, the stunt switcher 504, and the bypass switcher 506 all have the appropriate input-to-output mappings, streaming video sent from the SVS 400 to the MCS 500 may be channeled through the entities in the MCS and sent out the MCS.

4. Automation System

The automation system 508 may be configured to perform or to cause performance of one or more functions related to the television-broadcasting system 100. The automation system 508 may include a processor 538, a data storage 540, a user-interface 542 (e.g., including a display device), and a communication interface 544, all of which may be connected by a connection mechanism (not shown). The processor 538 may include one or more general-purpose processors (e.g., microprocessors) and/or special-purpose processors (e.g., digital signal processors and/or application specific integrated circuits).

The data storage 550 may include one or more volatile and/or non-volatile storage components and may be integrated in whole or in part with the processor 538. The data storage 450 may take the form of a non-transitory computer-readable medium and may include a set of program instructions, that when executed by the automation system 508 (e.g., by the processor 538), cause performance of a set of functions. For example, the automation system 508 may cause the RAPS 300, the SVS 400, the MCS 500, the air-chain system 600, an entity included therein, and/or another entity to perform one or more of the functions described in this disclosure. The automation system 508 may cause such functions to be performed by sending instructions and/or other data via a corresponding communication interface and/or connection mechanism to the appropriate device.

The automation system 508 may receive data via the same path. In one example, the automation system 508 sends and receives data according to a video disk control protocol (VDCP). For example, the automation system 508 may receive from the bypass switcher 506, an indication of the input-to-output mappings used by the bypass switcher such that the automation system may determine whether the scheduled video was actually sent to the air-chain system for broadcast. The automation system 508 may use these indications to generate an as-run log, which is a report of what was actually broadcast.

In some instances, the automation system 508 may perform functions described herein as being performed by the traffic system 200. Likewise, in some instances, the traffic system 200 may perform functions described herein as being performed by the automation system 508. This may be the case, for example, where the traffic system 200 and the automation system 508 operate using a "live log" approach, where the traffic system 200 may be configured to query the automation system 508, manage the log and make scheduling-related decisions itself, and provide log entries (perhaps one at a time) to the automation system for processing.

E. Air-Chain System

Figure 6:
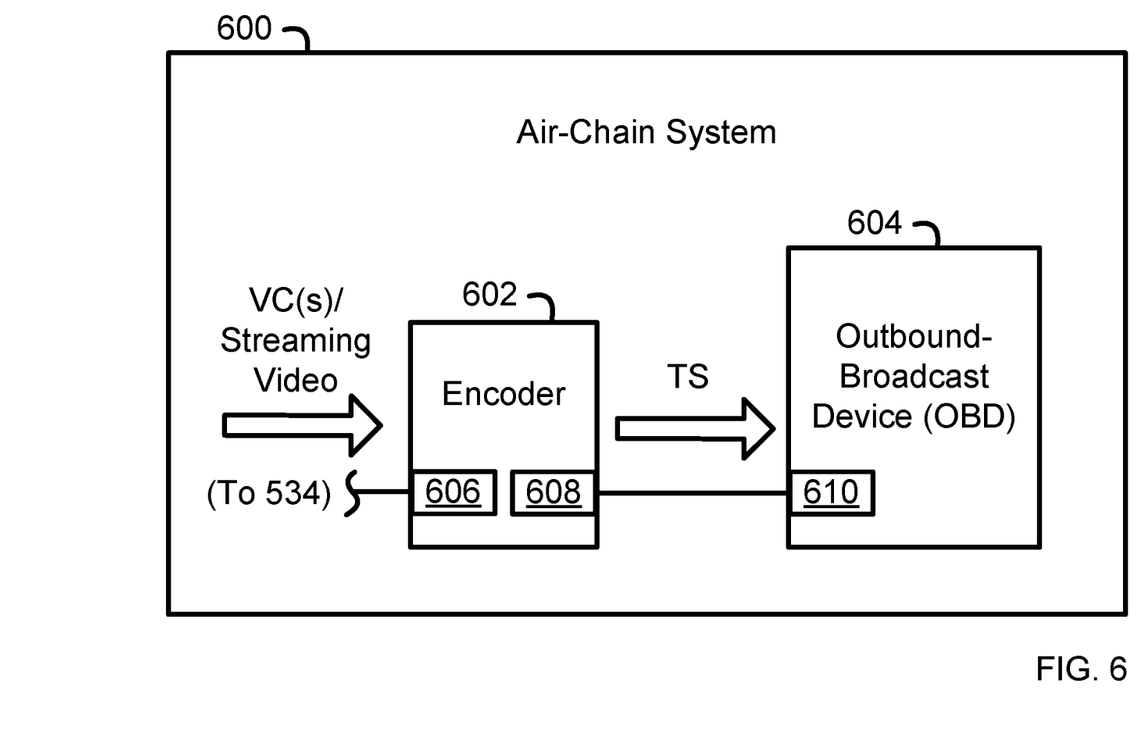
FIG. 6 is a simplified block diagram of an example air-chain system.

FIG. 6 shows the air-chain system 600 in greater detail. The air-chain system 600 may be configured to prepare and broadcast video received from the MCS 500 to an audience. The air-chain system 600 may include an encoder 602 and an outbound-broadcast device (OBD) 604.

The encoder 602 may be configured to receive video from a source entity, generate a transport stream (TS) (that includes the video), and send the generated TS to a destination entity. The TS may be described as including video, meaning that the TS includes the encoded representation of the video, among other things. The encoder 602 may include an input 606 and an output 608, each of which may be connected by a connection mechanism (not shown). The bypass switcher 506 may be connected to the encoder 602 via the output 534 and the input 606.

In one example, the encoder 602 may generate a TS by, among other things, encoding video based on the HD-SDI standard to video based on the MPEG 2 standard. An example of an encoder is the NetVX provided by Harris Corporation of Melbourne, Fla.

The OBD 604 may be configured to receive a TS from a source entity, and broadcast the TS (i.e., including video) to multiple destination entities for viewing by an audience. The OBD 604 may include an input 610, and the encoder 602 may be connected to the OBD via the output 608 and the input 610.

It should be noted that the term television-broadcast as used in this disclosure refers broadly to the distribution of video to an audience, and is not meant to be limited to distribution of video in any particular manner. Accordingly, the OBD 604 may take the form of a transmitter, satellite, or terrestrial fiber transmitter (e.g., any of which may correspond with a service provider). As another example, the OBD 604 may also take the form of a network connection (e.g., for broadcasting the TS to an audience via the Internet).

The television-broadcasting system 100 described above is one non-limiting example. Indeed, the disclosed systems may include some or all of the entities discussed above, and may be arranged in different ways as would be apparent to one of ordinary skill in the art.

III. Example Methods

Figure 7A:
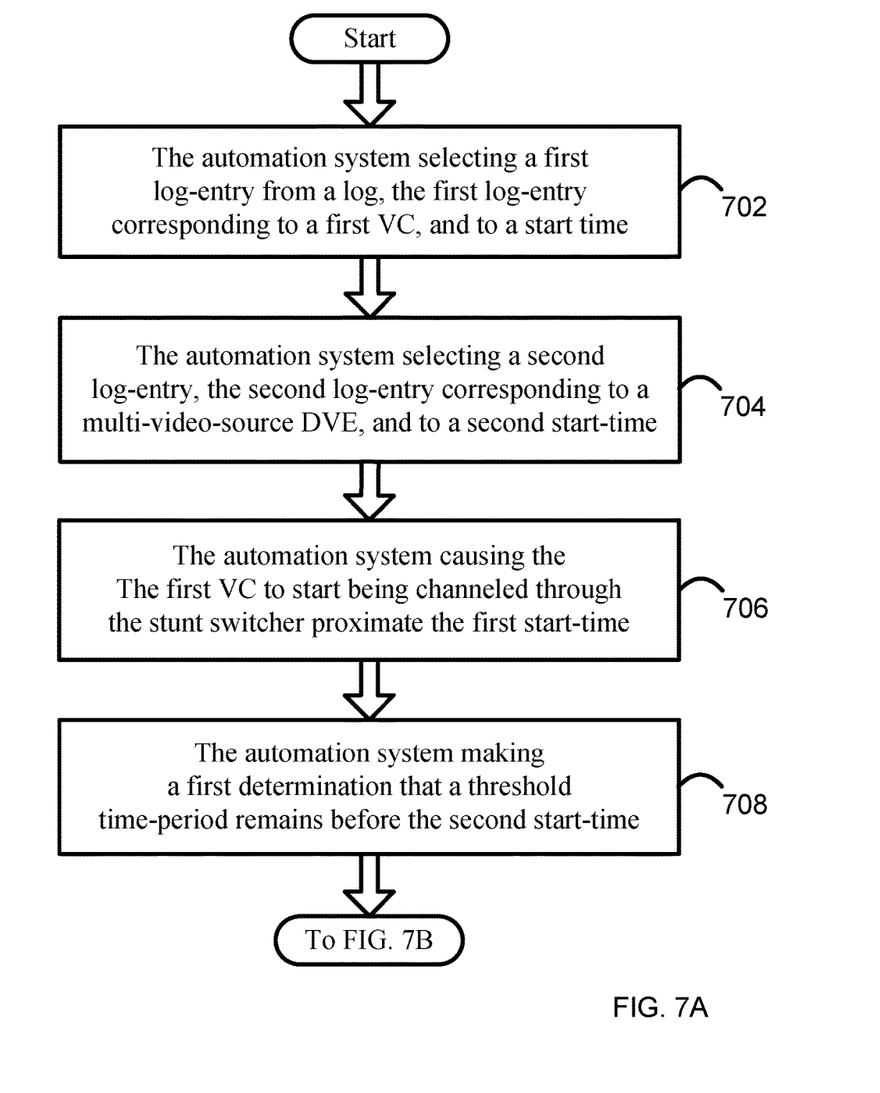
FIG. 7A shows a first part of a flow chart illustrating functions in accordance with an example method.
Figure 7B:
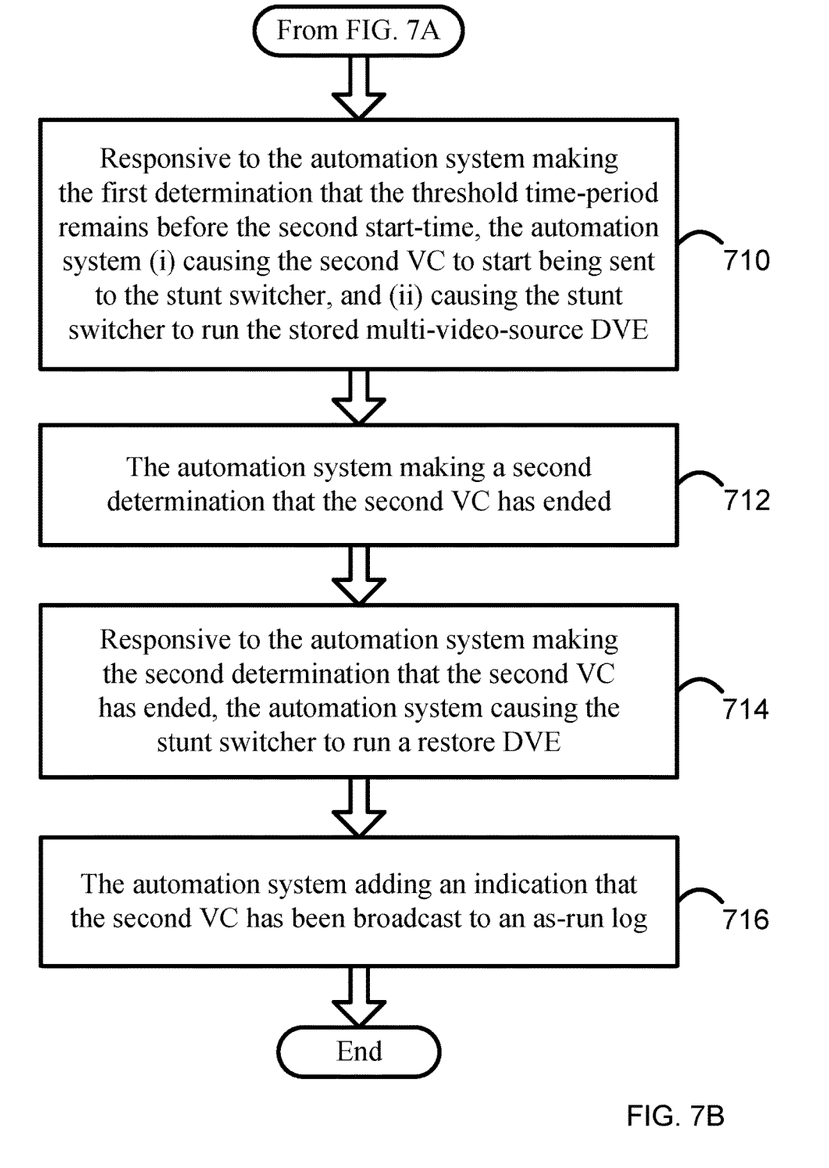
FIG. 7B shows a second part of the flow chart of FIG. 7A.

FIGS. 7A and 7B show a flow chart illustrating functions in accordance with an example method. At block 702, the method may involve the automation system 508 selecting (i.e., retrieving or accessing) a first log-entry from a log. The first log-entry may correspond to a first VC stored in the data storage 304. In one example, the first log-entry includes a house identifier (e.g., stored in a house-identifier field of the log entry) that maps to the first VC. The first log-entry may also correspond to a first start-time (e.g., as represented by an absolute, calculated or manual start time stored in a start-time field of the first log-entry).

The automation system 508 may select the first log-entry according to the corresponding first start-time. For example, if the first log-entry includes a first start-time represented as an absolute start time, the automation system 508 may select the first log-entry at the absolute start time (e.g., when a current time matches the absolute start time). As another example, if the first log-entry includes a first start-time represented as a calculated start time, the automation system 508 may select the first log-entry when the preceding log entry gets "completed" (i.e., when the VC of the previous log entry has played for its corresponding duration). As yet another example, if the first log-entry includes a manual start time, the automation system 508 may select the first log-entry in response to receiving a request (e.g., from a user) to select the first log-entry. Notably, in some instances the automation system 508 may select the first log-entry "ahead of schedule" (e.g., three hours before the first start-time). This may allow the automation system 508 and/or another entity to perform or prepare to perform certain functions in advance of the first start-time.

The first log-entry may also include a duration (e.g., in a duration field). The duration indicates the duration of the first VC, and therefore the duration is a non-zero duration. This results in the automation system 508 "pausing" on the first log-entry for the duration of the first VC (e.g., for the duration of the first VC as recorded in a RAPD).

At block 704, the method may involve the automation system 508 selecting a second log-entry. The second log-entry may correspond to a second VC (e.g., stored in the data storage 304) and to a multi-video-source DVE (e.g., stored in the data storage 529). An example manner in which the second log-entry may correspond to both the second VC and the multi-video-source DVE is described in greater detail below.

The second log-entry may correspond to a second start-time, where the second start-time is later than the first start-time (since the first log-entry has a non-zero duration). The second log-entry may also include a duration. However, unlike the first log-entry, the second log-entry may include a zero duration. As a result, the automation system 508 does not "pause" on the second log-entry when traversing the log. In some instances, a traffic system may be configured to prevent use of a log entry having a zero duration. In such instances, it may be desired to configure the second log-entry with a nominal duration (e.g., one second) such that the traffic system deems the first log-entry acceptable.

At block 706, the method may involve the automation system 508 causing the first VC to start being channeled through the stunt switcher 504 proximate (i.e., at or near) the first start-time. In one example, this may involve the automation system 508 sending a request to the RAPS 300 to send the first VC to the stunt switcher (according to a protocol understood by the RAPS 300), which in turn causes the first RAPD 302 to retrieve and send the second VC to the stunt switcher 504 via the router 502. This may allow first VC to be sent to the air-chain system 600 for broadcast. Since the RAPD 302 retrieving the first VC may take a few seconds, the automation system 508 may begin performing the related functions in advance of the first start-time such that the first VC is channeled through the stunt switcher 504 proximate the first start-time.

At block 708, the method may involve the automation system 508 making a first determination that a threshold time-period remains before the second start-time. At block 710, the method may involve responsive to the automation system 508 making the first determination that the threshold time-period remains before the second start-time, the automation system causing the second VC to start being sent to the stunt switcher 504, and further causing the stunt switcher to run the stored multi-video-source DVE.

In one example, the automation system 508 causing the second VC to be sent to the stunt switcher 504 may involve the automation system sending a request to the RAPS 300 to send the second VC to the stunt switcher (according to a protocol understood by the RAPS 300), which in turn causes the second RAPD 303 to retrieve and send the second VC to the stunt switcher 504 via the router 502. Likewise, in one example, the automation system 508 causing the stunt switcher 504 to run the multi-video-source DVE may involve the automation system sending a request to the stunt switcher 504 to run the multi-video-source DVE (according to a protocol understood by the stunt switcher). In some instances, a parameter may be included in the log entry (e.g., in the one or more auxiliary-notation fields) that may be used to identify and/or configure the multi-video-source DVE.

As a result of the stunt switcher 504 running the multi-video-source DVE, the stunt switcher may output a combined video that includes both the first VC and the second VC (e.g., in side-by-side windows as described above). Further in response to the automation system 508 making the first determination, the automation system 508 may select the second VC as the audio source and/or the closed-captioning source for the combined video. However, in some instance one or more of the described effects may be broken up into separate DVEs with each DVE being run separately.

Figure 8:
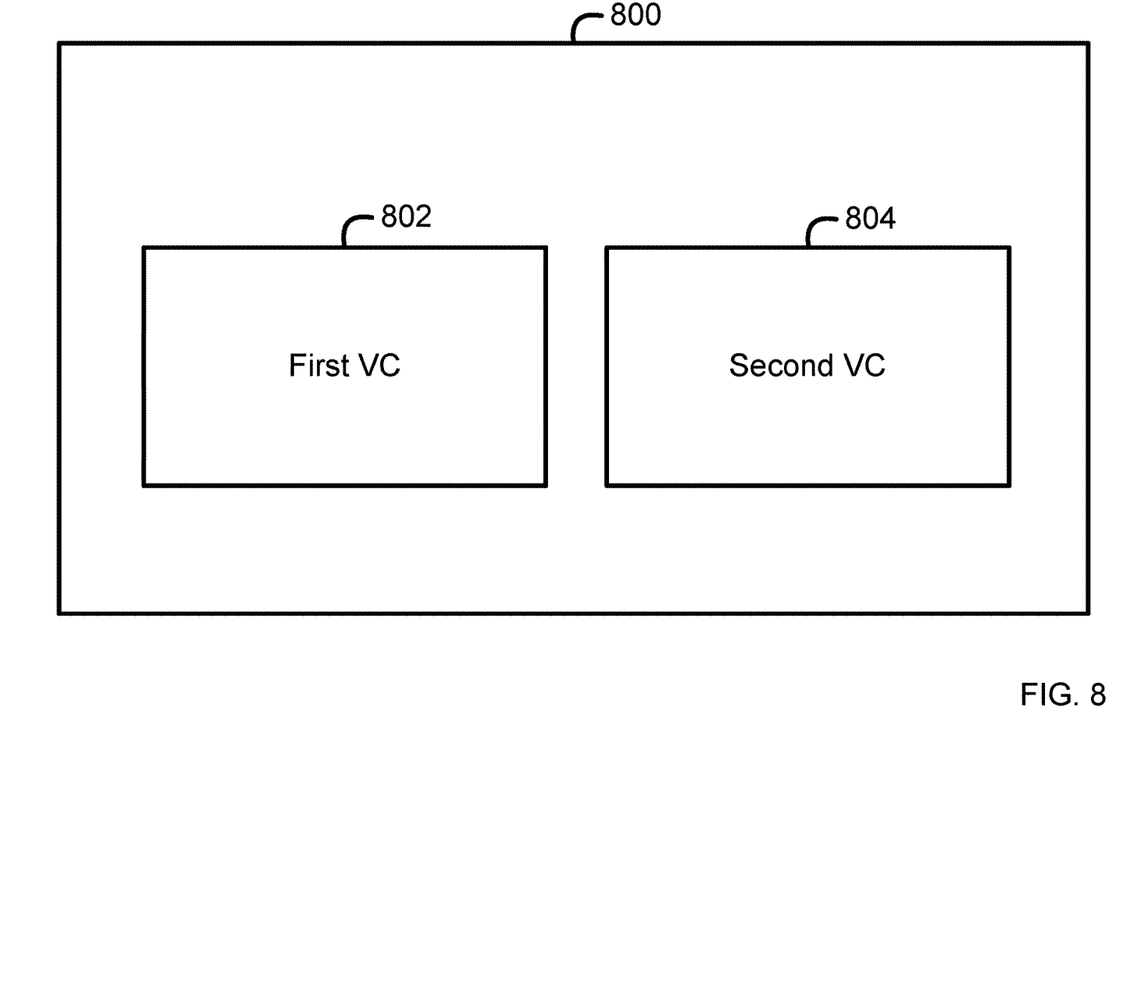
FIG. 8 shows an example combined video created by running a multi-video-source DVE.

The threshold time-period allows the automation system 508 to perform one or more of the described functions according to a "negative offset" of the second start-time. As such, the threshold time-period may therefore dictate when the stunt switcher 504 runs the multi-video-source DVE, and may be set (e.g., by a user) as desired. For example, if the threshold time-period is forty-five seconds, the stunt switcher 504 may run the multi-video-source DVE forty-five seconds before the second start-time (and therefore forty-five seconds before the first VC ends). For example, at that time the stunt switcher 504 may pull back the first VC into a left window, and add the second VC into a right window. As a result, the stunt switcher 504 may output a combined video that includes both the first VC and the second VC as shown in the respective windows. FIG. 8 shows an example of such a combined video 800 that includes a left window 802 showing the first VC and a right window 804 showing the second VC.

Further, as noted above the multi-video-source DVE may cause the second VC to be selected as the audio source and/or the closed-captioning source for the combined video. The stunt switcher 504 may then output the combined video, such that it may be sent to an air-chain system 600 for broadcast.

At block 712, the method may involve the automation system 508 making a second determination that the second VC has ended (i.e., when the second VC has been played for its duration). At block 714, the method may involve responsive to the automation system 508 making the second determination that the second VC has ended, the automation system causing the stunt switcher 504 to run a restore DVE (e.g., stored in the data storage 529). Therefore, once the second VC ends (e.g., after thirty seconds assuming that the second VC has a duration of thirty seconds), the automation system 508 may resume channeling the first VC through the stunt switcher 504.

As noted above, a restore DVE may be configured to (when run) effectively terminate the multi-video-source DVE (i.e., by removing the windows and causing only the first VC to be channeled through the stunt switcher. The restore DVE may also select the first VC as the audio source and/or the closed captioning source for the output of the stunt switcher 504. Once the first VC ends, the automation system 508 may continue broadcasting video as scheduled in the log.

While certain types of DVEs has been described above (e.g., a multi-video source DVE and a restore DVE), in some instances additional DVEs may be run to provide smooth video transitions before or after running another DVE. For example, a transition DVE may be run just before the multi-video-source DVE is run, and may provide a transition such as by slowly pulling back the full-frame first VC into the left window of the combined video that is provided by the multi-video-source DVE. Likewise, a transition DVE may be run between the running of the multi-video-source DVE and the restore DVE such as to slowly push the second VC in the right window to full-frame.

In some instances, it may be desired to track when the first and/or second VC has been broadcast. This may be particularly useful in connection with certain types of VCs, namely ones that include advertisements that may be need to be tracked for billing purposes. As such, at block 716, the method may involve the automation system 508 adding an indication that the first and/or second VC has been broadcast to an as-run log. In one example, the automation system 508 may further indicate how long the first and/or second VC was broadcast.

In one example, the second log-entry may include an identifier that maps to a set of scripts (or other program instructions), such as PHP-Hypertext-Preprocessor (PHP) scripts, that when executed by the automation system 508 cause the automation system to perform one or more of the functions, such as those at blocks 708-714 as described above. Notably, other types of scripts may also be used, including for example customized scripts that are configured to perform functions in a television-broadcasting environment. Such scripts may be executed by a corresponding interpreter installed in the automation system 508. In one example, the identifier may be stored in a house-identifier field of the second log-entry. The identifier may have a particular property (e.g., a predefined prefix) to allow the automation system 508 to differentiate between the identifier and a house identifier that is typically included in a house-identifier field (e.g., as with the second log-entry described above). As such, responsive to the automation system 508 determining that the first log-entry includes the identifier, the automation system 508 may execute the set of scripts and therefore, perform the corresponding functions. In one example, the automation system 508 may begin executing the set of scripts proximate the second start-time or perhaps in advance of the second start-time (e.g., based on a negative offset) as described above.

A further description of the manner in which an automation system 508 may use the identifier to trigger execution of the set of scripts is described in cross-referenced U.S. patent application Ser. No. 13/828,682 entitled "Systems and Methods for Causing a Stunt Switcher to Run a DVE."

In view of the discussion above, an example set of scripts is provided below (parameter descriptions are shown inside arrow brackets):

START_TIME_OFFSET (<offset>)
LOAD_AND_ROUTE (<second-VC house-identifier>, <second-VC token>, <stunt-switcher identifier>)
RUN_EFFECT_PLAY_RUN_EFFECT (<multi-video-source DVE identifier>, <restore-DVE identifier>, <stunt-switcher identifier>, <second-VC token>)
EXIT.

The "START_TIME_OFFSET (<offset>)" command may cause the automation system 508 to wait until a target time to proceed. The target time is defined by a negative offset of the second start-time. For example, START_TIME_OFFSET (−900) would halt the automation system's execution of the scripts at this command until 900 frames before the second start-time. As such, in one example, the automation system 508 making a first determination that a threshold time-period remains before the second start-time may involve the automation system determining that a current time equals the defined negative offset of the second start-time. However, a variety of other timing techniques may be used.

The "LOAD_AND_ROUTE (<second-VC house-identifier>, <second-VC token>, <stunt-switcher identifier>)" command may cause the automation system 508 to cause a second VC to be loaded and routed (sent) to an input of the stunt switcher 504. The second-VC house-identifier maps to the second VC. The second-VC token may be used as an identifier such that other scripts (such as the "RUN_EFFECT_PLAY_RUN_EFFECT" command described below) may refer to the second VC without identifying a particular physical input of the stunt switcher 504. Among other things, this allows the stunt switcher 504 to route video without indicating to other devices the particular physical input it is using. The stunt-switcher identifier identifies a particular stunt switcher that will be used. For example, a "LOAD_AND_ROUTE (PR1234, T, 504)" command may cause the automation system 508 to load the second VC mapped to by PR1234 in the RAPD 303 such that it may send the second VC (via the router 502) to an input of the stunt switcher 504. The automation system 508 may then use the token T to refer to the loaded second VC that will be sent in this manner.

The "RUN_EFFECT_PLAY_RUN_EFFECT (<multi-video-source DVE identifier>, <restore-DVE identifier>, <stunt-switcher identifier>, <second-VC token>) command may cause the automation system 508 to cause a stunt switcher to run a multi-video-source DVE that uses the second VC (together with the first VC). Further, once the second VC ends, the automation system 508 may cause the stunt switcher to run a restore DVE. The multi-video-source DVE identifier identifies the multi-source DVE to run, and the second-VC token identifies the loaded second VC to use in connection with the multi-video-source DVE. The restore-DVE identifier identifies the restore DVE to run once the second VC ends. The stunt-switcher identifier identifies the stunt switcher that should run the multi-video-source and the restore DVEs, and that should receive the second VC.

For example, the command "RUN_EFFECT_PLAY_RUN_EFFECT (20, 21, 504, T) may cause the automation system 508 to cause the stunt switcher 504 to run a multi-video-source DVE identified as DVE 20 (stored in the data storage 529). Further, the command may cause the automation system 508 to use in connection with the multi-video-source DVE, the second VC routed in accordance with the "LOAD_AND_ROUTE" command described above, and referred to by the second-VC token T. Then, once the second VC ends, the automation system 508 may cause the stunt switcher 504 to run the restore DVE identified as DVE 21.

The "EXIT" command may terminate the automation system's 508 execution of the set of scripts.

The set of scripts may also be used to perform other functions, including for example adding an indication that the first and/or second VC has been broadcast to an as-run log as described above. Further, the scripts may provide a "time out" period and a corresponding action to handle an instance in which the set of scripts runs for longer than the time out period. For example, the action may involve simply terminating execution of the set of scripts.

By using an identifier that maps to a set of scripts in the manner described above, a user (e.g., a traffic manager) may include an appropriate identifier in a traffic entry of the log to easily cause a stunt switcher to run a multi-video-source DVE and/or a restore DVE at an appropriate time as configured in the corresponding set of scripts. In one example, the second log-entry may be positioned as the next log entry after the first log entry.

As described above, the automation system 508 select log entries ahead of schedule. For example, the automation system 508 may select the second log-entry before the second start-time, such that it may perform appropriate actions that are timed according to the negative offset as described above. This may result in the automation system 508 performing functions related to both the first and second log entries simultaneously, or perhaps contemporaneously. For example, the automation system 508 may cause a VC to be channeled through the stunt switcher 504, while simultaneously executing a set of scripts. As the set of scripts execute, the corresponding functions may be performed, and therefore both the first VC and the second VC broadcast at the same time (as the multi-video-source DVE is run).

IV. Example Variations

While one or more functions of the disclosed methods have been described as being performed by the certain entities (e.g., the automation system 508), the functions may be performed by any entity, such as those included in the television-broadcasting system 100 described above. Further, the described steps throughout this application need not be performed in the disclosed order, although in some examples, an order may be preferred. Also, not all steps need to be performed to achieve the desired advantages of the disclosed systems and methods, and therefore not all steps are required. Further, the variations described throughout this disclose may be applicable to any of the disclosed systems or methods.

Further, while select examples have been described, alterations and permutations of these examples will be apparent to those of ordinary skill in the art. Other changes, substitutions, and alterations are also possible without departing from the disclosed systems and methods in its broader aspects as set forth in the following claims.

The invention claimed is:

1. A non-transitory computer-readable medium having stored thereon program instructions that upon execution by a processor, cause performance of a set of functions for use in a television broadcasting system having a master control system, the set of functions comprising:
   selecting, by the master control system, a first log entry from a traffic log accessed from a traffic system, wherein the traffic log is a broadcast schedule for a given station during a given time period, and wherein the first log entry corresponds to a first video component (VC) and to a first start time;
   selecting, by the master control system, a second log entry from the traffic log, wherein the second log entry corresponds to a multi video source digital video effect (DVE), and to a second start time, wherein the second start time is later than the first start time;
   causing the first VC to start being channeled through a stunt switcher proximate the first start time;
   making a determination that a threshold time period remains before the second start time; and
   responsive to making the determination that the threshold time period remains before the second start time, (i) causing a second VC to start being sent to the stunt switcher, and (ii) causing the stunt switcher to run the multi-video-source DVE, thereby causing the stunt switcher to output a combined video, wherein the combined video includes both the first VC and the second VC.

2. The non-transitory computer-readable medium of claim 1, the set of functions further comprising:
   responsive to making the determination that the threshold time period remains before the second start time, selecting the second VC as an audio source for the combined video.

3. The non-transitory computer-readable medium of claim 1, wherein the second VC comprises a promotion VC.

4. The non-transitory computer-readable medium of claim 1, wherein the first log entry includes a non zero duration and wherein the second log entry includes a zero duration.

5. The non-transitory computer-readable medium of claim 1, wherein the second log entry is the next log entry after the first log entry.

6. The non-transitory computer-readable medium of claim 1, wherein the second log entry includes the second start time represented as a calculated start time.

7. The non-transitory computer-readable medium of claim 1, wherein the second log entry includes a house identifier field and an identifier stored in the house identifier field, wherein the identifier maps to a set of program instructions that when executed cause performance of the functions of (i) making the determination that the threshold time period remains before the second start time, and (ii) responsive to making the determination that the threshold time period remains before the second start time, (a) causing the second VC to start being channeled through the stunt switcher, and (b) causing the stunt switcher to run the multi-video-source DVE, thereby causing the stunt switcher to output the combined video; and wherein the set of functions further comprises responsive to determining that the second log entry includes the identifier, executing the set of program instructions.

8. The non-transitory computer-readable medium of claim 7, wherein the set of program instructions comprises a set of PHP Hypertext Preprocessor (PHP) scripts.

9. The non-transitory computer-readable medium of claim 1, wherein the determination is a first determination, the set of functions further comprising:
   making a second determination that the second VC has ended; and
   responsive to making the second determination that the second VC has ended, causing the stunt switcher to run a DVE, thereby causing only the first VC to be channeled through the stunt switcher.

10. The non-transitory computer-readable medium of claim 1, the set of functions further comprising:
   adding an indication that the second VC has been broadcast to an as run log.

11. A method for use in a television broadcasting system having a master control system, the method comprising:
   an automation system selecting a first log entry from a traffic log accessed from a traffic system, wherein the traffic log is a broadcast schedule for a given station during a given time period, and wherein the first log entry corresponds to a first video component (VC) and to a first start time;

the automation system selecting a second log entry from the traffic log, wherein the second log entry corresponds to a multi video source digital video effect (DVE), and to a second start time, wherein the second start time is later than the first start time;

the automation system causing the first VC to start being channeled through a stunt switcher proximate the first start time;

the automation system making a determination that a threshold time period remains before the second start time; and responsive to the automation system making the determination that the threshold time period remains before the second start time, the automation system (i) causing a second VC to start being sent to the stunt switcher, and (ii) causing the stunt switcher to run the multi-video-source DVE, thereby causing the stunt switcher to output a combined video, wherein the combined video includes both the first VC and the second VC.

12. The method of claim 11, further comprising:
responsive to the automation system making the determination that the threshold time period remains before the second start time, the automation system selecting the second VC as the audio source for the combined video.

13. The method of claim 11, wherein the second VC comprises a promotion VC.

14. The method of claim 11, wherein the first log entry includes a non zero duration and wherein the second log entry includes a zero duration.

15. The method of claim 11, wherein the second log entry is the next log entry after the first log entry.

16. The method of claim 11, wherein the second log entry includes a house identifier field and an identifier stored in the house identifier field, wherein the identifier maps to a set of program instructions that when executed cause the automation system to perform the functions of (i) making the determination that the threshold time period remains before the second start time, and (ii) responsive to making the determination that the threshold time period remains before the second start time, (a) causing the second VC to start being channeled through the stunt switcher, and (b) causing the stunt switcher to run the multi-video-source DVE, thereby causing the stunt switcher to output the combined video; and wherein the method further comprises responsive to determining that the second log entry includes the identifier, the automation system executing the set of program instructions.

17. A master control system configured to perform a set of functions comprising:

selecting a first log entry from a traffic log accessed from a traffic system, wherein the traffic log is a broadcast schedule for a given station during a given time period, and wherein the first log entry corresponds to a first video component (VC) and to a first start time;

selecting a second log entry from the traffic log, wherein the second log entry corresponds to a multi-video-source digital video effect (DVE), and to a second start time, wherein the second start time is later than the first start time;

causing the first VC to start being channeled through a stunt switcher proximate the first start time;

making a determination that a threshold time period remains before the second start time; and responsive to making the determination that the threshold time period remains before the second start time, (i) causing a second VC to start being channeled through the stunt switcher, and (ii) causing the stunt switcher to run the multi-video-source DVE, thereby causing the stunt switcher to output a combined video, wherein the combined video includes both the first VC and the second VC.

18. The master control system of claim 17, the set of functions further comprising:
responsive to making the determination that the threshold time period remains before the second start time, selecting the second VC as the audio source for the combined video.

19. The master control system of claim 17, wherein the first log entry includes a non zero duration and wherein the second log entry includes a zero duration.

20. The master control system of claim 17, wherein the second log entry includes a house identifier field and an identifier stored in the house identifier field, wherein the identifier maps to a set of program instructions that when executed cause an automation system to perform the functions of (i) making the determination that the threshold time period remains before the second start time, and (ii) responsive to making the determination that the threshold time period remains before the second start time, (a) causing the second VC to start being channeled through the stunt switcher, and (b) causing the stunt switcher to run the multi-video-source DVE, thereby causing the stunt switcher to output the combined video; and wherein the set of functions further comprises responsive to determining that the second log entry includes the identifier, executing the set of program instructions.

* * * * *